United States Patent [19]

Goss et al.

[11] Patent Number: 4,799,145

[45] Date of Patent: Jan. 17, 1989

[54] FACILITY FOR PASSING DATA USED BY ONE OPERATING SYSTEM TO A REPLACEMENT OPERATING SYSTEM

[75] Inventors: Gary J. Goss, Acton; Thomas S. Hirsch, Bedford; Thomas O. Holtey, Newton, all of Mass.

[73] Assignee: Honeywell Bull Inc., Minneapolis, Minn.

[21] Appl. No.: 99,698

[22] Filed: Sep. 21, 1987

Related U.S. Application Data

[63] Continuation of Ser. No. 719,772, Apr. 3, 1985, abandoned.

[51] Int. Cl.⁴ .......................... G06F 15/00; G06F 9/00
[52] U.S. Cl. ..................................... 364/200; 364/300
[58] Field of Search ... 364/200 MS File, 900 MS File, 364/300

[56] References Cited

U.S. PATENT DOCUMENTS

| | | | |
|---|---|---|---|
| 4,481,578 | 11/1984 | Hughes et al. | 364/200 |
| 4,530,052 | 7/1985 | King et al. | 364/200 |
| 4,533,996 | 8/1985 | Hartung et al. | 364/200 |
| 4,590,557 | 5/1986 | Lillie | 364/200 |
| 4,675,814 | 6/1987 | Murai et al. | 364/300 |

FOREIGN PATENT DOCUMENTS

58-115567 9/1983 Japan .

Primary Examiner—Raulfe B. Zache
Assistant Examiner—Thomas C. Lee
Attorney, Agent, or Firm—John Solakian; George Grayson

[57] ABSTRACT

A computer system includes a first processor with main memory, an input/output processor with associated memory and an archival memory. Prior to reloading a new operating system from archival memory into the main memory, information such as timer information is stored in the input/output memory. The input/output memory continues to update the timer information until the second operating system is bootstrap loaded into the main memory. The timer and other information may then be returned to the first processor and main memory for use by the second operating system.

13 Claims, 4 Drawing Sheets

| BYTE NUMBER | HI 0 | | BIT REFERENCE 7 8 | | | 15 | BYTE NUMBER | FUNCTION |
|---|---|---|---|---|---|---|---|---|
| 0 | RFU | CPU LEVEL | MBZ | B | N | MBZ | 1 | |
| 2 | CHANNEL NUMBER | | | | FUNCTION CODE | | 3 | I/O |
| 4 | DATA HIGH | | | | DATA LOW | | 5 | |
| 6 | ADDRESS HIGH | | | | ADDRESS LOW | | 7 | |
| 8 | (RHU BY I/O PROCESSOR) | | F | B | RFU | | 9 | INTERRUPT |
| A | CHANNEL NUMBER | | | | LEVEL | | B | LSI-6 |
| C | 0→7(R) & 8→F(B) | | S | T | F | RFU | D | |
| E | DATA/REGISTER CONTENTS | | | | | | F | |
| 10 | ADDRESS/REGISTER CONTENTS (LOW) | | | | | | 11 | REGISTERS |
| 12 | (NOT USED) | | | | RFU | A/R HIGH | 13 | |
| | EVEN BYTE | | | | ODD BYTE | | | |

FACILITY FOR PASSING DATA USED BY ONE OPERATING SYSTEM TO A REPLACEMENT OPERATING SYSTEM

This application is a continuation of application Ser. No. 719,772, filed 4/31/85, now abandoned.

RELATED APPLICATION

The following United States applications assigned to the same assignee as the instant application are incorporated by reference:

1. Direct Multiplex Control Facility, having Ser. No. 503,963, filed June 13, 1983, now U.S. Pat. No. 4,665,482.
2. Microcomputer System with Independent Operation Systems, having Ser. No. 719,771, filed Apr. 3, 1985, now U.S. Pat. No. 4,722,048.

BACKGROUND

1. Field of the Invention

This invention relates generally to computer systems, and more particularly to computer systems having multiple processors, each processor being capable of executing on its own independent operating system and wherein the computer system has an improved initial program loader (bootstrap loader) method and hardware.

2. Description of the Prior Art

Computer systems are generally comprised of hardware and software. Computer hardware per se cannot perform any of the tasks of a computer without the necessary software. Various types of software are needed to have the computer perform its jobs and tasks in a coordinated manner. These programs are divided generally into two major categories—operating system programs and application programs. The operating system is generally comprised of such programs as the supervisor program (also called an executive or a monitor program), job-control programs, assemblers, compilers, editors, etc. The application programs are the user programs which perform user tasks, such as payroll programs, inventory programs, etc. The application programs generally are supervised by the operating system; i.e., they may be compiled, scheduled, edited, etc. The operating system also translates or compiles application programs so that they become intelligible to the computer.

However before a single program can be executed, it must first be entered into the computer storage. Since a machine without any programs is a "dumb" machine, how can the necessary programs be entered into computer storage? Generally a microsequence initiated by a load button on the machine console controls entry of a very small amount of data into storage starting at address 0. Usually the initial program-load control enters only a small amount of data, such as for example, a single card or seven words. Accordingly this starts a program with a first instruction as read in by the initial program-load microsequence. The information entered by the microsequence contains instructions to read more information into storage which is part of a more general loading routine. In this way, the machine "bootstraps" itself to enter first a loader routine and then uses this to load other data and programs from an external device to main memory of the computer system. Although the initial block of information entered may be quite small, it typically contains instructions to load more instructions until the loader routine is entered which can control general program-data entry.

In a multiprogramming multiprocessing system when a "bootstrap" operation has been signaled, the input/output (I/O) processor takes control. Generally it has to stop any I/O operations that were in progress, reset all the channel registers that are contained within its I/O memory, and in addition it must get the main processor to reset all of its registers, its memory management unit, and clear its main memory area. (This initializing procedure occurs generally when a new operating system is to be loaded.) Then the I/O processor utilizing a "bootstrap load" routine will "bootstrap" load the operating system and application programs. The computer system will then be ready to execute programs and perform the jobs and tasks assigned to it.

In a multiprogramming multiprocessing system a computer system may be operating under control of one operating system at any given time. If it is desired to change operating systems, the above initializing procedure is generally resorted to. As can be seen, this is time-consuming. Moreover, when an operating system is changed, there is no way to pass information from the previous operating system to the current operating system. Therefore it becomes inefficient to shut-down one operating system and "bootstrap load" another operating system. What was needed therefore to improve the efficiency of switching from one operating system to another operating system was a method and means for passing information from one operating system to the other, thus "bridging" the bootstrap load procedure.

OBJECTS OF THE INVENTION

It is a primary object of the invention to provide an improved digital computer system.

It is another object of the invention to provide an improved "bootstrap" loading method and apparatus for a computer system.

It is still a further object of the invention to provide an improved "bootstrap" loading method and apparatus whereby the computer system is switched from one operating system to another.

Yet another object of the invention is to provide an improved method and apparatus for passing information from one operating system to another during or after "bootstrap" load operations.

SUMMARY OF THE INVENTION

The foregoing objects are achieved according to one embodiment of the invention by providing hardware and firmware for storing and passing on information; e.g. time-of-day, from one operating system, which is being discontinuous in main memory, to another operating system which is replacing it.

In one embodiment of the invention a supervisory channel timer (hereinafter referred to as SCT 226) is provided. The SCT is a 32 bit real time counter with one second resolution. It is started when loaded by software, but is not stoppable by software. Once started, it counts (upwards) until powered down. The SCT contains correct time across a software "bootstrap" key operation. The SCT has two I/O function code pairs on the microSystem 6/10 as follows:

| Function Code (HEX) | Function |
|---|---|
| FC-10 | Input SCT high word |
| FC-12 | Input SCT low word |

| Function Code (HEX) | Function |
|---|---|
| FC-11 | Output SCT high word |
| FC-13 | Output SCT low word |
| FC-14 | Input G.P. high word |
| FC-16 | Input G.P. low word |
| FC-15 | Output G.P. high word |
| FC-17 | Output G.P. low word |

In order to provide indivisible updating of the SCT, the input high SCT (FC-10) and the output low SCT (FC-13) will be NAK'd (i.e., the CPU i-indicator 201a will be reset and will prevent the I/O from interrupting the updating; hence the I/O will have to try again to interrupt.) In this application the term ACK is loosely used to be synonymous of success in accomplishing the objective of the I/O instruction, whereas NAK is used to indicate failure if the SCT is in the process of being updated when they are issued.

In order to provide coherent loading/unloading of the SCT, the following mechanism is implemented. For input, execution of FC-10 will cause both halves of the SCT to be read by firmware with the high word being returned and the low word being saved in a firmware work location. Execution of the FC-12 will merely return the current contents of this work location. FC-12 will never by NAK'd; i.e., interruption can occur.

For output operations, execution of FC-11 will merely cause the output data to be saved in a firmware work location. FC-11 will never be NAK'd. Execution of the FC-13 will cause the contents of this work location to be loaded into the SCT high word, the FC-13 output word to be loaded into the SCT low word, and the SCT to be started, if not already running.

In another embodiment, two additional words are provided in the RAM space of the I/O processor. These words are utilized to pass a message from one operating system to another operating system being bootstrapped into the computer, because these words are not initialized during the bootstrap operation and the information therein is available for the second operating system when it is bootstrapped loaded into the computer. These words utilize function codes FC-14 thru FC-17. Moreover these words do not require the indivisible updating or reacting of low and high registers as in the case supra.

Accordingly the invention provides a method and hardware for passing the time-of-day from one operating system to another; and also for passing other information of interest to the second system, such as for example, the purpose for which it was called and bootstrap loaded into the computer.

DESCRIPTION OF A PREFERRED EMBODIMENT

General Description

Figure 1:
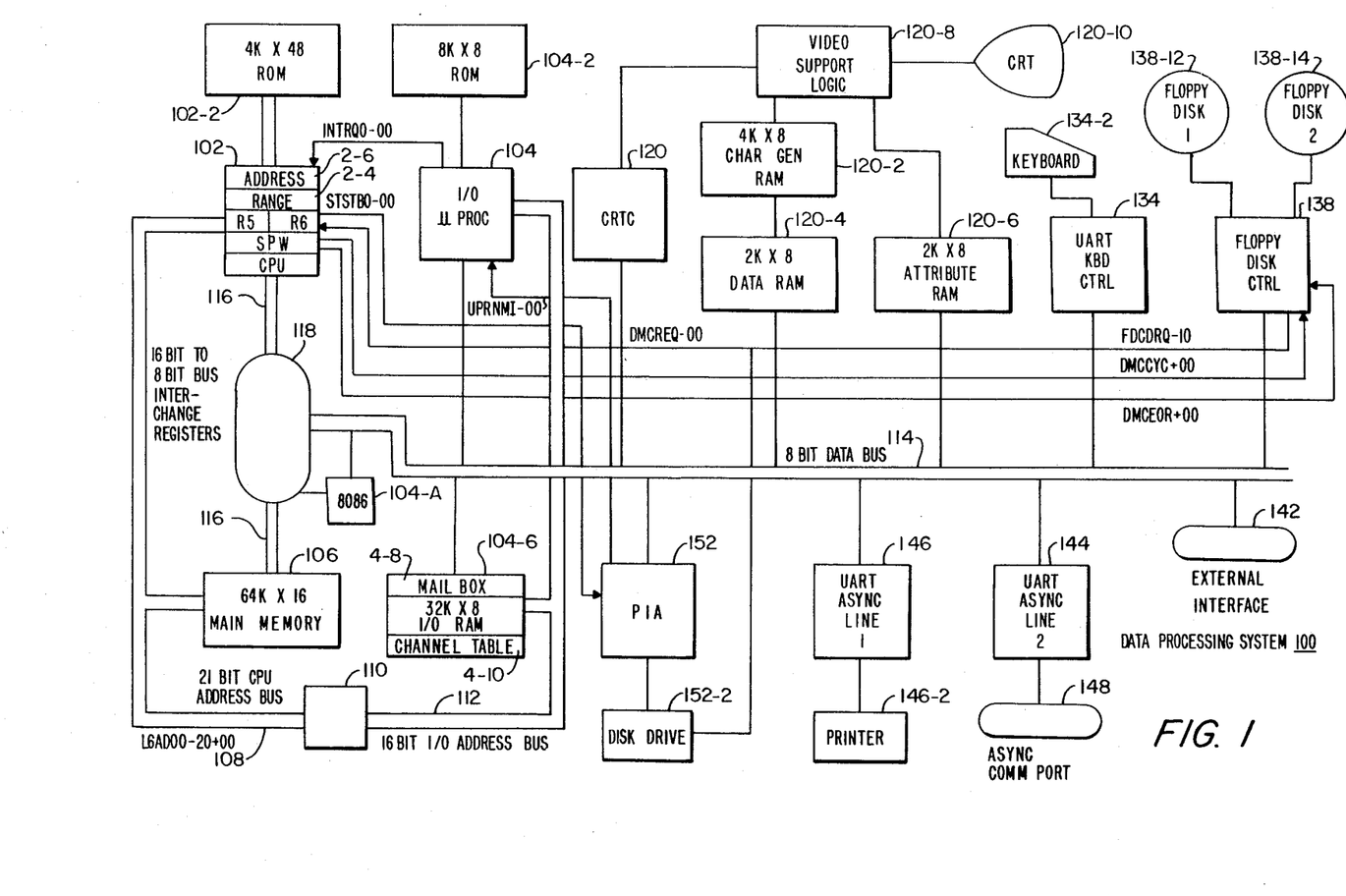
FIG. 1 is a high-level block diagram of the microSystem 6/10 computer system incorporating the invention.

Referring now to FIG. 1 there is shown an overall diagram of a data processing system 100, which includes a firmware-controlled central processing unit (CPU) 102 as an application processor and a I/O microprocessor 104 as an input/out processor. The CPU 102 is a Honeywell LSI-6 type which runs the Honeywell MOD200 or MOD400 operating system, or any other operating system. Systems applications are performed by the CPU 102 executing software programs stored in a 64K×16-bit word or larger main memory 106. The microprograms used by the CPU 102 to execute the software instructions are stored in a 4K×48-bit word read only memory (ROM) 102-2.

Associated with the I/O microprocessor 104 are an 8K×8-bit byte read only memory (ROM) 104-2 and a 32K×8-bit byte random access memory (RAM) 104-6. The ROM 104-2 stores the firmware routines necessary for the start-up and initialization of the data processing system 100. The RAM 104-6 stores tables, communications control programs and firmware for emulating a universal asynchronous receive/transmit controller (UART) 144, firmware for controlling a number of devices including a keyboard 134-2 by means of a UART 134 by means of a floppy disk controller (FDC) 138, a printer 140-2 by means of a UART 146 and a cathode ray tube controller (CRTC) 120. The RAM 104-6 also includes a number of locations used as a "mailbox" by the CPU 102 and I/O microprocessor 104 to communicate with each other.

CPU 102 and main memory 106 are coupled to each other by 21-bit address bus 108 and a 16-bit data bus 116. Data is transferred between CPU 102 and main memory 106 over data bus 116 from an address specified by CPU 102.

Data bus 116 is coupled to bus interchange registers 118. Also coupled to bus interchange registers 118 is an 8-bit data bus 114. Bus interchange registers 118 receive 16-bit data words from data bus 116 for transfer over data bus 114 as two 8-bit bytes, and also receive 8-bit bytes from data bus 114 for transfer over data bus 116. The I/O microprocessor 104, RAM 104-6, CRTC 120, UARTs 134, 144 and 146 and FDC 138 are coupled in common to data bus 114.

A 16-bit I/O address bus 112 is coupled to address bus 108 via a transceiver 110 and also coupled to I/O microprocessor 104 to I/O RAM 104-6, thereby enabling both CPU 102 and I/O microprocessor 104 to address main memory 106 and RAM 104-6.

Also coupled to data bus 114 are a peripheral interface adapter 152 for controlling a disk drive 152-2, an asynchronous line UART 144 for receiving and transmitting the data characters via an asynchronous port 148, a 2K×8-bit word data random access memory (RAM) 120-4 for storing characters for display on a CRT 120-10 and a 2K×8-bit word attribute random access memory (RAM) 120-6 for storing attribute characters. Attribute characters are used typically for such CRT 120-10 display functions as underlining characters or character fields for causing certain selected characters or character fields to blink or be displayed with higher intensity. Character codes stored in RAM 120-4 are applied to a 4K×8-bit word character generator random access memory (RAM) 120-2 which generates the codes representative of the raster lines of data which display the characters on the face of the CRT 120-10. A video support logic 120-8 is coupled to the CRTC 120, character generator RAM 120-2 and attribute RAM 120-6 for generating the lines of characters on the face of the CRT 120-10.

The FDC 138 is typically an NEC u PD 765 single-/double density floppy disk controller described in the NEC 1982 catalog, published by NEC Electronics U.S.A. Inc., Microcomputer Division, 1 Native Executive Park, Natick, Mass. 01760.

The I/O microprocessor 104 is typically a Motorola MC68B09 8-bit microprocessing unit. The PIA 152 is typically a Motorola MC68B21 peripheral interface adapter. The CRTC 120 is typically a Motorola MC68B45 CRT controller.

The I/O microprocessor 104, PIA 152 and CRTC 120 are described in the Motorola Microprocessor Data Manual, copyright 1981, by Motorola Semiconductor Products Inc., 3501 Bluestein Boulevard, Austin, Tex. 78721.

The UARTs 134, 144 and 146 are Synertics 2661 universal asynchronous receive/transmit controllers described in the Synertics MOS Microprocessor Data Processor Manual, copyright 1982, by Synertics Corporation, 811 East Arques Avenue, Sunnyvale, Calif. 94086.

The logic elements and firmware involved in the mass-storage to/from memory data transfer are known as the data multiplex control (DMC) facilities. The bus cycle during which the data is transferred is referred to as a DMC cycle. The microSystem 6/10 system and these configurations are more fully described in United States patent application Ser. No. 503,963, filed on June 13, 1983, entitled "Direct Multiplex Control Facility" and assigned to the same assignee as the instant invention now U.S. Pat. No. 4,665,482.

Detailed Description

Figure 2:
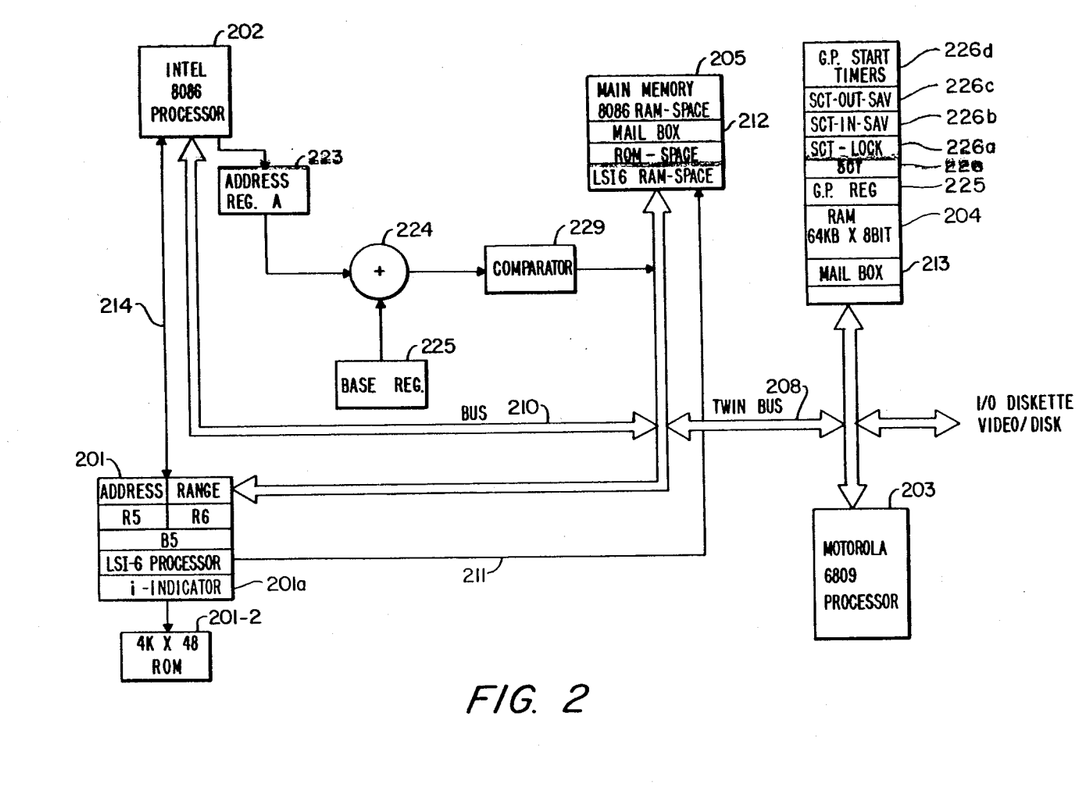
FIG. 2 is high-level block diagram of the invention.
Figure 3:
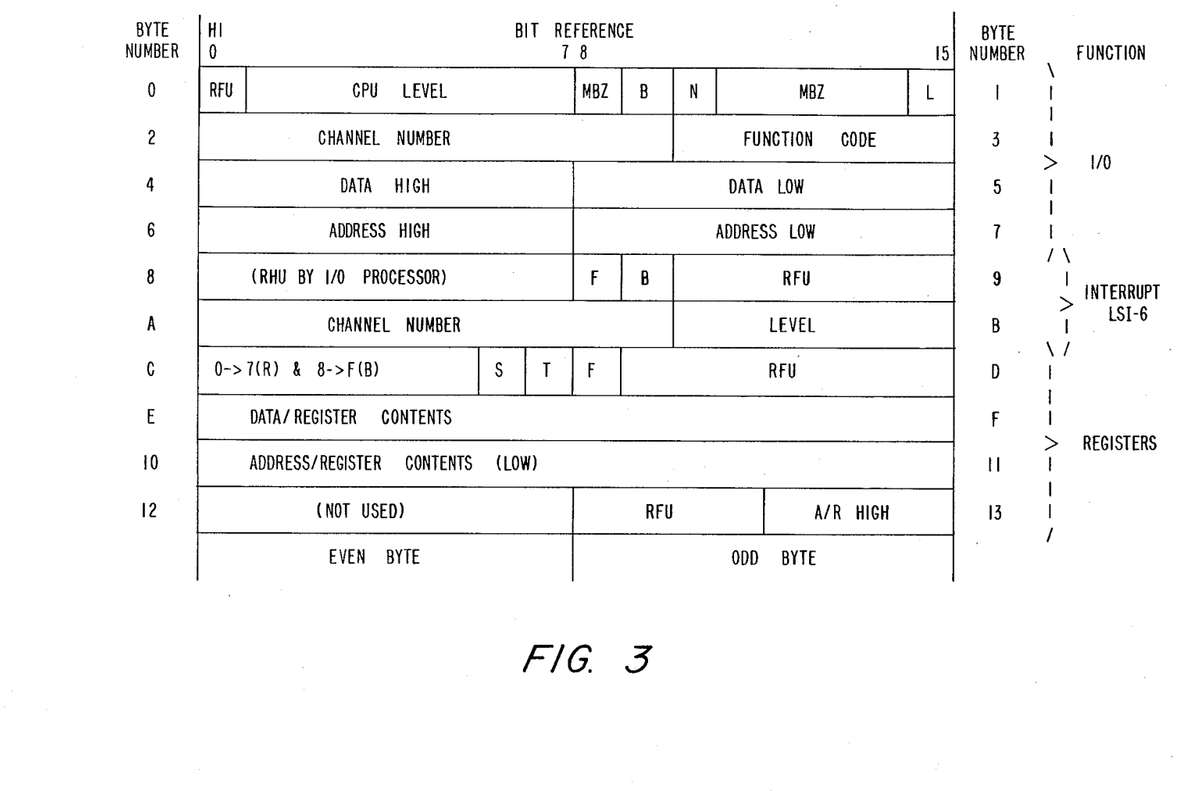
FIG. 3 is the mainbox map located in the RAM space of the I/O processor.

Referring now to FIG. 2 there is shown a block diagram of the architecture of the invention. The basic Honeywell microSystm 6/10 system without an 8086 personal computer option comprises a main memory 205 which can be accessed by a Honeywell LSI-6 processor 201 and a Motorola 6809 type processor 203. Also coupled to the Motorola 6809 type processor is a random access memory (RAM) 204. Since the LSI-6 processor is a 16-bit processor, the random access memory 205 is coupled to it via a 16-bit bus 211. The Motorola 6809 processor being an 8-bit machine and also the RAM 204 being 8 bits wide is coupled to the main memory 205 via a twin bus 208 which is comprised of two 8-bit type busses. Accordingly the LSI-6 processor 201 can access main memory 205 and RAM 204; and also the Motorola type 6809 processor 203 can access main memory 205 and RAM 204. This system comprised of the LSI-6 processor 201, main memory 205, RAM 204 and Motorola 6809 type processor 203 is the basic microSystem 6/10 system. It is firmware driven and accordingly very fast utilizing only about 20-25% of the available memory cycles of main memory 205; i.e., it uses 25% of available memory band-width. The LSI-6 processor 201 is the workhorse of the computer system. It operates basically under a Honeywell MOD400 or MOD200 operating system, or any other operating system, and executes user programs compatible with these operating systems. On the other hand, the Motorola 6809 type processor 203 operates as an input/output processor utilizing its local memory 204, 99% of the time. It is designed to have access to main memory 205 when the LSI-6 processor 201 is not utilizing main memory 205.

An Intel 8086 type microprocessor 202 is also coupled to main memory 205 via bus 210. The Intel 8086 processor 202 can utilize an MSDOS or CPM-86 operating system which can executes commodity software written for the IBM personal computer. Accordingly the microSystem 6/10 system has the IBM personal computer emulator board as an add-on option. The 8086 processor 202, being software driven, is much slower and requires approximately 70-75% of the main memory cycles. It is imperative, therefore, if each of the processors 201, 202 and 203 are to operate independently and concurrently on their own operating systems and execute independent user programs that the relationship regarding the main memory band-width requirements of each processor be maintained. In addition to this requirement, each processor 201 and 202 must have its own allocated memory space in main memory 205. This is achieved by utilizing an address register A 223 together with a base register 225 coupled to an adder 224 and a comparator 229. The base register stores an offset which is added to the address from the 8086 processor 202 stored in address register A 223 via adder 224. Accordingly all addresses requested of main memory by Intel 8086 processor 202 will begin at a predetermined offset from the base of main memory 205. A comparator 229 ascertains that the predetermined boundaries of the RAM space allocated to each processor is not exceeded. Since LSI-6 processor 201 request addresses directly to the memory and are not offset, each processor 201 and 202 will have its own working space in main memory 205. Additionally a ROM space below the base of the 8086 memory 205 has been provided for. This ROM space is addressed by negative addresses from 8086 processor 202. In this space data can only be read out from main memory 205 by the 8086, but cannot be written into this area during execution. Accordingly this space stores read only programs such as BIOS for the 8086 processor 201. Although the Intel 8086 type processor 202 cannot access the memory space reserved for the LSI-6 processor 201, because of the boundaries set up via comparator 229, the LSI-6 processor, on the other hand, is not inhibited in that way and accordingly can access main memory space 205 in any area including the 8086 space. Therefore, in order for the 8086 type processor 202 to communicate with the LSI-6 processor 201, a semaphore-/mailbox 212 is provided in the RAM space reserved for 8086 processor 202. Access to the RAM memory 204 and to other peripherals, such as USARTs, diskettes, etc. is made via a program executing in the LSI-6 processor 201. The LSI-6 processor 201 via a firmware routine located in ROM 201-2 utilizes mailbox 213 located in the I/O RAM space 204 for addressing the physical devices, such as the ones mentioned supra, rather than addressing them directly. (This aspect of the system is described further when FIG. 3 is described infra.)

Mailbox 212 in main memory space 205, however, is utilized in communicating between processors 201 and 202. In operation, the LSI-6 processor is responsible for initiating input/output (I/O) operations. Accordingly when the Intel 8086 type processor 202 wishes to access an I/O device, it is necessary to send a message to mailbox 212. Under normal operation the LSI-6 processor 201 monitors mailbox 212 and initiates service to 8086 as requested. All communication between the LSI-6 and I/O devices is performed by the LSI-6 processor 201 via the LSI-6 firmware located in ROM 201, and the I/O processor 203. The LSI-6 processor 201-2 in turn communicates with the I/O processor 203 via a mailbox 213 located in the I/O processor RAM 204. (The mailbox 213 layout is shown in FIG. 3 and its use and description is disclosed infra.)

This hardware and method, together with additional hardware and firmware and additional function codes, are used to pass information from one operating system to another and thus facilitate switching from one operating system to another. Accordingly a supervisory channel timer (SCT) 226 and firmware (described infra) are added to store the time-of-day, and update the timer at one second intervals. Additionally G.P. registers 225 are added and utilized to store other information that one operating system uses to pass on to another operating system during bootstrap load. These hardware registers are not cleared when the computer system is initialized and bootstrap loaded.

It is thus seen that all intercommunication between the Level 6 software and I/O devices is performed via the LSI-6 firmware located in ROM 201-2, and the I/O processor 203 which in turn communicate with each other via a mailbox area 213 located in the I/O processor's RAM 204.

Referring now to FIG. 3, the mailbox map of mailbox 213 is shown. The mailbox map has 13 bytes, each byte comprised of 8 bits. The even numbered bytes are stored on the left-hand side of the mailbox and the odd numbered bytes are stored on the right-hand side.

Bytes 1–7 of the mailbox are used to transfer between the LSI-6 firmware located in ROM 201-2 and I/O processor 203 the information that is required to implement the I/O instructions. The LSI-6 processor 201 loads information into bytes 2–7 and into a hardware register (not shown) and then sets a hardware bit (not shown) which interrupts the I/O processor. When the I/O processor has completed handling the I/O order, it sets a response code in byte 1 and then resets the hardware bit.

Bytes 0–1

Bits 2–7 of byte 0 define the current interrupt level of the LSI-6 processor 201. This data is maintained at a current state by the LSI-6 firmware. If the current interrupt level is numerically lower than or equal to the interrupt level of an I/O subsystem, no interrupt from that I/O subsystem will be attempted. As long as the requested interrupt has not been serviced by the application processor, the I/O processor will retry the interrupt at a later time. The retry operation will continue until the interrupt is accepted or the interrupt condition is reset.

Bit 9 of byte 1 is the I/O processor's busy bit. If an attached I/O subsystem (i.e., a printer, terminal, etc.) and the Level 6 system software requests an additional function that cannot be processed immediately, the busy bit will be set to a 1 by the I/O processor. This action is the same type of message response as the NAK reply on a standard Level 6 bus.

Bit 10 of byte 1 is the non-existent resource bit. It is set to a 1 by the I/O processor when the Level 6 system software is addressing a subsystem or device that does not exist in the microSystem 6/10 configuration being used.

The remaining bits of byte 1 are not pertinent to the invention and will not be discussed.

Bytes 2 and 3

Bits 0–9 define the channel number for the device to which the I/O order is addressed. If the application processor (the LSI-6) 201 inserts a channel number which is not available, the N-bit in byte 1 will be set by the I/O processor. Bits 10–15 of byte 3 define the function code of the I/O order.

The function codes which are used to implement the invention will be discussed in greater detail infra.

Bytes 4 and 5

These bytes contain data for I/O orders.

Bytes 6 and 7

These bytes define the lowest order 16 bits of a 20-bit address. The 4 highest order address bits and the byte offset are passed to the I/O processor through a hardware register (not shown).

Interrupt Bytes 9, A, B

When an interrupt is attempted, the I/O processor 203 loads information into bytes A and B and sends a hardware interrupt bit to the LSI-6 processor 201. The LSI-6 processor fetches bytes A and B, sets its response into byte 9 and clears the hardware interrupt bit.

Byte 9 is the control byte for the interrupt mailbox. Byte 9, bit 8 is the flag bit (F) which is set to a 1 by the I/O processor to indicate that there is an outstanding interrupt to be serviced. When the LSI-6 processor has taken the interrupt data, it will reset the flag (F) bit to 0. Bit 9 is set by the LSI-6 processor if the interrupt was not accepted (NAK).

Byte A and Bits 8 and 9 of Byte B

Byte A and Bits 8 and 9 of Byte B contain the channel number of the device generating the interrupt. Bits 10–15 of byte B contain the interrupt level that is assigned to that channel.

Register and Temporary Storage

The bytes that comprise the data multiplex control (DMC) registers and temporary storage are defined below.

Byte C

Bits 0–3 define which Level 6 register is to be transferred to/from the I/O mailbox. If the contents of bits 0–3 are values from 0 to 7, a 16-bit CPU R-register in LSI-6 processor 201 is to be transferred to/from bytes E and F. If the contents of bits 0–3 are values from A to F, a 20-bit CPU B-register is to be transferred to/from bytes 10, 11 and 13.

Bit (S) of byte C is the transfer direction flag. The 0 state indicates that the direction is into the mailbox; whereas the 1 state indicates that the direction is into the LSI-6 processor.

Bit (T) of byte C indicates which type of information is stored in bytes E through 11 and 13. When it is a 0, the information is data multiplex control (DMC) information. When it is a 1, the information is Level 6 register information, in which case both a range and address are transferred by bytes E, F, 11 and 13.

Byte D

Bit (F) indicates, when set to 1, that there is a register transfer operation in process.

RFU is space reserved for future use.

Bytes E and F

These bytes are used in the transfer of data. They contain either the range of a DMC operation or the contents of a 16-bit Level 6 register.

Bytes 10, 11 and 13

These bytes are used in the transfer of data. They contain either the address of a DMC operation or the contents of a 20-bit Level 6 register. Bytes 10 and 11 contain the 16 lowest order address bits and byte 13 contains the highest order 4 bits.

Figure 5:
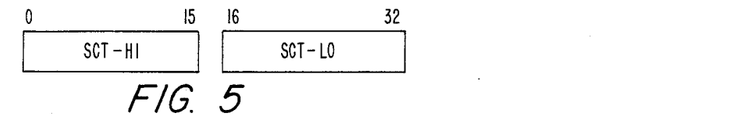
FIG. 5 shows the format of the SCT counter.

Referring now to FIG. 5 the SCT is shown. The SCT is comprised of two registers SCT-HI and SCT-LO each register is capable of storing one 16 bit word for a total of 32 bits. The SCT has a resolution of 1 second. The SCT is located in I/O RAM 204 and denoted therein by reference numeral 226. The SCT is loaded by LSI-6 software utilizing the I/O instructions described infra. Once loaded by the software, it is not stoppable by software and is maintained every second by firmware to be described infra. Accordingly the SCT contains the correct time in seconds across a software "bootstrap load" operation.

Figure 4A:
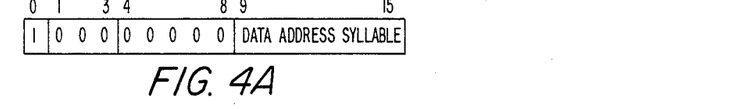
FIGS. 4A, 4B, 4C are formats of instructions utilized by the LSI-6 processor in Input/Output (I/O) operations.
Figure 4B:
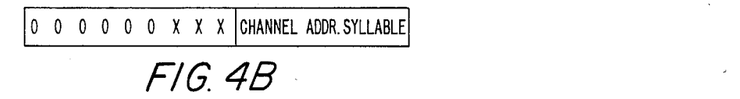
Figure 4C:
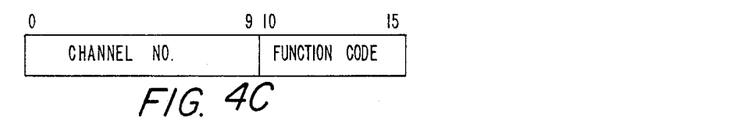

Referring to FIGS. 4A, 4B and 4C there are shown typical formats of instructions generally stored in main memory 205 utilized by the LSI-6 processor in Input-/Output (I/O) operations. With respect to FIGS. 4A and 4B bits 0 through 8 identify the type of I/O instruction, whereas bits 9 through 15 identify the address from or to where information is being transferred. With regard to this invention it is desired to transfer information, for example, in terms of the time-of-day from the SCT 226 to main memory 205 or to a register in the LSI-6 processor 201 for use by a newly loaded operating system. The direction in which the transfer is made is indicated by the function code. The function codes and function are as follows:

| Function Code (Hex) | Function |
|---|---|
| FC-10 | Input SCT high word |
| FC-11 | Output SCT high word |
| FC-12 | Input SCT low word |
| FC-13 | Output SCT low word |

If it is desired to transfer information to a position in main memory addressed by the address syllable in the I/O instruction, either function code 10 or 12 is used. Function code 10 transfers information out of the higher order word of the SCT; whereas function code 12 transfers information out of the low order word of the SCT. This information is first transferred to mailbox area 213, and then to the LSI-6 processor via a data word of the I/O instruction.

If it is desired to reverse the flow of information as when the SCT is being set to a given date by the LSI-6, function codes 11 and 13 are utilized in the I/O instructions and the procedure is reversed.

In order to provide coherent loading/unloading of the SCT, the following mechanism is implemented. For input, execution of FC-10 will cause both halves of the SCT to be read by firmware with the high word being returned and the low word being saved in a firmware work location. Execution of FC-12 will merely return the current contents of the work location. FC-12 will never be NAK'd.

For output, execution of FC-11 will merely cause the output data to be saved in the firmware work location. FC-11 will never be NAK'd. Execution of the FC-13 will cause the contents of this work location to be loaded into the SCT high word, the FC-13 output word to be loaded into the SCT low word, and the SCT to be started, if not already running.

Referring now to FIG. 4C there is shown the format of yet another type of I/O instruction wherein the first 10 bits are utilized for storing the channel number. This number identifies the channel to or from which information is transferred. (Typical channels in this architecture are mailboxes 212, 213, each of which is assigned a predetermined channel number.) The function code as described supra indicates for this invention the direction of information flow and is placed in bits 10–15 of the instruction for execution.

Figure 6A:
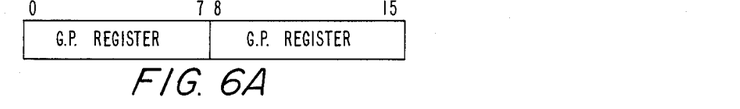
FIGS. 6A, 6B show formats of the general purpose registers utilized in the invention.
Figure 6B:
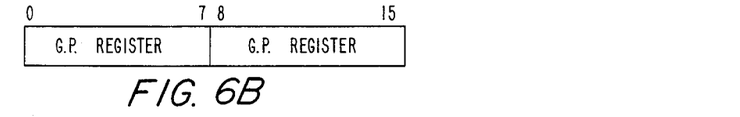

Referring to FIGS. 6A and 6B there are shown the formats for general purpose registers 225. Both registers have similar formats and are 16 bits long. These registers are also not eraseable before, during or after bootstrap load. These registers are loaded by the I/O instruction utilizing the appropriate function code, and contain coded information which can be passed to a newly located operating system, again via the I/O instruction utilizing the appropriate function code. Typical of the information that may be passed to a new operating system is the information necessary to determine whether or not the right firmware is in place for that operating system's key table. Other typical information that is passed to the new operating system is the function that it is to perform; i.e., word processing, calculation, etc.

The function codes for transferring information to and from the G.P. registers 225 are as follows:

| Function Code (Hex) | Function |
|---|---|
| FC-14 | Input G.P. high word |
| FC-16 | Input G.P. low word |
| FC-15 | Output G.P. high word |
| FC-17 | Output G.P. low word |

Figure 6C:
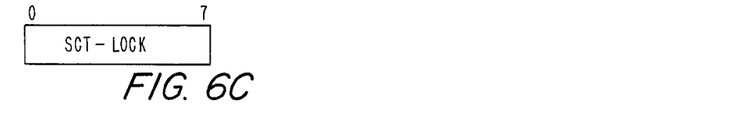
FIGS. 6C–6E show formats of registers utilized in the invention.

Referring now to FIG. 6C, there is shown the format of the SCT-LOCK 226a located in RAM 204. The SCT-LOCK is a one byte word comprised of 8 bits. When the SCT-LOCK is set to 0 an I/O instruction will not be successful in transferring information and software will have to re-try its execution again. If the SCT-LOCK is set to 1, the I/O instruction will be successful in accomplishing its objective.

If an I/O instruction is successful, and i-indicator 201a is set via a procedure called ACK; whereas if an I/O instruction is not successful in accomplishing its objective, the i-indicator 201a is reset by a procedure called NAK. (Accordingly it should be noted that in this application the term ACK is synonymous to success; whereas the term NAK is synonymous with failure to accomplish the objective of the I/O instruction.).

Figure 6D:
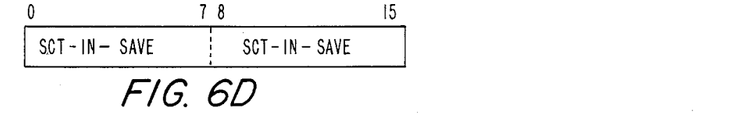
Figure 6E:
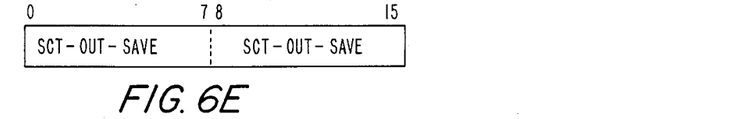

Referring now to FIGS. 6C and 6D, there is shown the formats of the SCT-IN-SAVE and SCT-OUT-SAVE registers respectively. Each format is comprised of 2 bytes of 8 bits each. They are both located in the 6809 processor RAM 204 and are utilized for saving input or output information respectively.

In conjunction with the combination of hardware described supra, there are associated three firmware routines as follows:

A. Input/output firmware routine (I/Os) to SCT-HIGH and SCT-LOW respectively. I/Os are executed at non-maskable interrupt (NMI) levels, which means that I/Os can interrupt the SCT handler firmware routine (to be described infra) but not vice versa. Therefore it is sufficient for the SCT handler firmware routine to set the SCT-LOCK and for the I/Os to merely test it.

B. SCT handler firmware routine which increments the SCT timer 226 once every second.

C. Start-SCT calls a General Purpose-START TIMER ROUTINE. This routine loads one of 16 General Purpose Timers 226d with a given value and marks it as running. It also stores the address of the handler routine for this timer in a table. All timers which are marked as running are continuously decremented at either 60 Hertz (standard) or 50 Hertz (optional if power frequency is 50 Hertz). When the timer reaches 0, it is marked as not running and the designated handler for this timer is entered as a subroutine.

The actual firmware routines are shown in detail below. Their functional flow is as follows:

I/O Firmware Procedures

Procedure - Input-SCT-High
If SCT-LOCK equals locked (0)
   NACK I/O (I/O unsuccessful software will retry).
If SCT-LOCK not locked; i.e., equals 1 (1), then make copy of SCT-LOW and save it in SCT-IN-SAVE)
   Return SCT-HIGH to I/O and call ACK
End input - SCT-HIGH
Procedure - Input-SCT-LOW
Return SCT-IN-SAVE to I/O and ACK (i.e., set i-indicator)
End Input - SCT-LOW
Procedure - Output-SCT-HIGH
Copy I/O word to SCT-OUT-SAVE and ACK
End Output- SCT-HIGH
Procedure - Output SCT-LOW
If SCT-LOK equals locked (0)
   NAK I/O (software will retry)
If SCT-LOCK equals unlocked (1)
   Copy SCT-OUT-SAVE and save in SCT-HIGH
   Copy I/O word to SCT-LOW
   Start SCT
   ACK I/O
End Output - SCT-LOW
SCT-HANDLER Procedure
SCT-LOCK equals locked (0) (this sets SCT-LOCK to 0)
SCT-LOW equals SCT-LOW+1 (this increments the SCT-LOW timer
If SCT-LOW equals 0
   SCT-HIGH equals SCt-HIGH+1
SCT-LOCK equals unlocked (1)
New start - SCT procedure
End SCT-HANDLER
Start - SCT Procedure
Call the General Purpose start timer routine with these parameters:
   Timer number equals SCT-TIMER
   Handler equals SCT-HANDLER (procedure above)
   Number of ticks equals 60 if a 60 Hertz machine
   Number of ticks equals 50 if a 50 hertz machine
End Start-SCT

```
MODEL: HERCULES                              RTL/6000 FILE EDIT                                    01/17/85
REVISION: CCC.00                           MICROPROGRAM SECTION                         IMAGE DOC.#: /R9.3/ASYNC-9.531

SEQUENCE: SSROS
                                                                                    ADDRESS    IMAGE
                                                                                    (HEX)      (HEX)

SUPERVISORY CHANNEL FUNCTION CODES 10# TO 13#
     SUPV CHAN TIMER IN/OUT

SUPV-MORE  TFR   (9,A)              / COPY FC                                       58A9       1F 93
           ANDI  (9,FR#)            / STRIP VARIABLE BITS                           58AB       C4 F8
           CMPI  (9,10#)            / CK FC = 10#-17#                               58AD       81 10
           LBNE  (SIO-NONX)         / NON-EXISTENT RESOURCE IF NOT                  58AF       10 26 00 9D

BITI  (A,04#)            / TEST IF 2ND GRP OF FUNC. CODES                58B3       85 04
           BNE   (SSUPV-1417)       / BR IF SO                                      58B5       26 4C

LDAI  (9,40#)            / NAK CODE                                      58B7       C6 40
           BITI  (A,01#)            / CK IN/OUT FC BIT                              58B9       85 01
           BNE   (SSUPV-1113)       / FC-11 OR FC-13 IF ON                          58BB       26 1F

FC-10 & FC-12 - INPUT SCT-HI & SCT-LO

BITI  (A,02#)            / CK IF FC-12                                   58BD       85 02
           BNE   (SSUPV-12)         / BR IF SO                                      58BF       26 12

FC-10 - INPUT SCT-HI - CK LOCK, THEN READ BOTH -HI & -LO, SAVE -LO

TSTE  (SSCT-LOCK)        / NO NEED TO LOCK IT - WE'RE IN NMI             58C1       7D 09 C5
           LBEQ  (SSUPV-RSP)        / NAK IF LOCKED (=0)                            58C4       10 27 FF BF

LDDE  (SSCT-2)           / GET SCT-LO                                    58C8       FC 09 B8
           STWE  (SSCTBF-2)         / SAVE IT FOR FC-12                             58CB       FD 08 C3

LDDE  (SSCT-0)           / GET SCT-HI                                    58CE       FC 09 B6
           BRA   (SSUPV-IN)         / RETURN IT                                     58D1       20 03

FC-12 - JUST RETURN SAVED SCT-LO

SSUPV-12   LDDE  (SSCTBF-2)         / GET SAVED SCT-LO                              58D3       FC 09 C3

PUT RETURN IN WBX AND ACK

SSUPV-IN   STWE  (SIOPX-3)          / PUT DATA WORD IN WBX                          58D6       FD CE 04
           CLRB                     / ACK CODE                                      58D9       5F A9
           BRA   (SSUPV-RSP)        / GO ACK AND END IO                             58DA       20 A9

-11 & FC-13 - OUTPUT SCT-HI & SCT-LO           SEQUENCE: SSROS

SSUPV-1113 BITI  (A,02#)            / CK IF FC-13                                   58DC       85 02
           BNE   (SSUPV-13)         / BR IF SO                                      58DE       26 04

-11 - OUTPUT SCT-HI - JUST SAVE FOR LATER

LDDE  (SIOPX-3)          / GET OUTPUT WORD                               58E0       FC 0E 04
           STWE  (SSCTBF-0)         / SAVE IT FOR LATER                             58E3       FD 08 C1
           LBRA  (SSUPV-RSP)        / GO ACK AND END I/O                            58E6       16 FF 9D

-13 - OUTPUT SCT-LO - CK LOCK, THEN LOAD BOTH SCT-HI & SCT-LO ;
           START SCT TIMER

SSUPV-13   TSTE  (SSCT-LOCK)        / TEST LOCK                                     58EA       7D 09 C5
           LBEQ  (SSUPV-RSP)        / NAK IF LOCKED - CODE LOADED AT -MORE-;        58ED       10 27 FF 96
```

```
 LDDE   ($SCT9F-0)     \ SAVED SCT-HI OUTPUT                  ;      58F1   FC 09 C1
 STWE   ($SCT-0)       \ TO SCT-HI                            ;      58F4   FD 08 89

LDDE   ($IOMX-3)      \ THIS FC DATA                         ;      58F7   FC 0E 04
 STWE   ($SCT-2)       \ TO SCT-LO                            ;      58FA   FD 08 88

BSR    ($ST-SCTMR)    \ START SCT TIMER                      ;      58FD   8D 39

CLRB                  \ ACK CODE                             ;      58FF   5F
 LBRA   ($SUPV-RSP)    \ ACK FC-13                            ;      5900   16 FF 94

GROUP OF SUPV CHAN IO'S - FC14-FC17                           ;
PARENT EXCEPT THAT LSB OF FC16 IS LOADED W/ BOOT ID CODE      ;

.17 LDXI   ($SCP-14)     \ PT TO 1ST OF GROUP                 ;      5903   8E 08 BD
    BITI   (A,02#)       \ TEST IF 2ND PAIR OF GRP            ;      5906   85 02
    BEQ    ($SUPV-14XX)  \  BR IF NOT                         ;      5908   27 02
    LEXXC  (X,2)         \ STEP PTR TO 2ND WORD               ;      590A   30 02
.XX BITI   (A,01#)       \ TEST IF OUTPUT FC                  ;      590C   85 01
    BNE    ($SUPV-1517)  \ BR IF SO                           ;      590E   26 05

LDDXR  (X,N)         \ GET WORD                           ;      5910   EC 84
    LBRA   ($SUPV-IN)    \ GIVE TO CP                         ;      5912   16 FF C1

.17 LDDE   ($IOMX-3)     \ GET OUTPUT WORD FROM IO MBX        ;      5915   FC 0E 04
    STWXR  (X,N)         \ STOW IT                            ;      5918   ED 84
    CLRB                 \ ACK CODE                           ;      591A   5F
    LBRA   ($SUPV-RSP)   \ GO ACK LSI-6 & END UP              ;      591B   16 FF 69
 OF
CTHAN   CLRE   ($SCT-LOCK)   \ SET SCT LOCK                   ;      591E   7F 08 C5
        LDDE   ($SCT-2)      \ SCT-LO                         ;      5921   FC 08 88
        ADWI   (1)           \ +1                             ;      5924   C3 00 01
        STWE   ($SCT-2)                                       ;      5927   FD 08 88
        BNE    ($SCTHAN-8)   \ AROUND IF LO HALF NOT NOW ZERO ;      592A   26 09

LDDE   ($SCT-0)      \ SCT-HI                         ;      592C   FC 08 89
        ADWI   (1)           \ +1                             ;      592F   C3 00 01
        STWE   ($SCT-0)                                       ;      5932   FD 08 89

CTHAN-9 LDAI   (B,01#)       \ LOCK CODE                      ;      5935   C6 01
        STAE   (B,$SCT-LOCK) \ RESET SCT LOCK                 ;      5937   F7 08 C5

START SCT TIMER                 ;

T-SCTMR LDAI   (B,60)        \ FOR 60 HZ                      ;      593A   C6 3C
        LDAE   (A,STSR2)     \ 7300 STATUS REG                ;      593C   B6 08 48
        BITI   (A,HZ50)      \ TEST IF SCREEN AT 50 HZ        ;      593F   85 08
        BEQ    ($STSCT-B)    \ BR IF NOT                      ;      5941   27 02
        LDAI   (B,50)        \ USE 50 HZ VALUE IF SO          ;      5943   C6 32
TSCT-B  CLRA                 \ FOR WORD VALUE                 ;      5945   4F
        TFR    (D,Y)         \ FOR CALL                       ;      5946   1F 02
        LDAI   (A,SCTTMR)    \  ALSO                          ;      5948   86 02
        LBSR   ($GO-STTMR)   \ START TIMER FOR ONE SECOND TIMEOUT ;  594A   17 FE A9
        CNST16 ($SCTHAN-V)   \ VECTOR FOR HANDLER BELOW       ;      594D   00 C4
        RTS                                                   ;      594F   39

SKIP HOF                                                      ;
```

Having described a preferred embodiment of the invention, those skilled in the art will realize that many variations and modifications may be made to affect the described invention and still be within the scope of the claimed invention. It is the intention, therefore, to limit the invention only as indicated by the scope of the claims.

What is claimed is:

1. In a computer system having at least first and second processors, a main memory coupled to said first processor, a second memory coupled to said second processor and an archival memory system such as disk memory, said first processor operating under a first operating system loaded into said main memory from said archival memory, apparatus for retaining information generated when said first processor is under control of said first operating system so that said information may be used by said first processor under control of a second operating system after being loaded into said memory from said archival memory, said retaining apparatus comprising:
    (a) first means for storing information generated while said first processor is under the control of said first operating system, the information to be utilized by said first processor under control of said second operating system, said first means being volatile storage means storing such information after said first processor is restarted under control of said second operating system; and
    (b) second means cooperating with said volatile first storage means for passing stored information to said first processor under control of said second operating system, said second means storing said stored information stored in said first means into said second memory as the main memory is reloaded with the second operating system,
wherein the information stored in the second memory is updated by the second processor until the updated information is return to the first means.

2. The invention of claim 1 wherein said stored information comprises timer information stored in timer means in said second memory.

3. The invention of claim 2 further comprising third means in said second processor coupled to said timer means for updating said timer means.

4. The invention of claim 3 further comprising fourth means coupled to said third means for preventing the interruption of the updating of said timer means.

5. The invention of claim 4 wherein said timer means is comprised of two registers, a high word and a low word, and including firmware means for loading and unloading information to or from said registers.

6. The invention of claim 1 wherein the second processor is an input output processor for handling input and output of data to and from the first processor.

7. The invention of claim 6 wherein the stored information comprises timer information and the timer information is updated by the input output processor until the updated information is returned to the first processor.

8. The invention of claim 7 wherein the timer information comprises two words, the system further comprising an interlock for preventing updating of the timer information by the input output processor with transfer of only a single word to or from the second memory.

9. The invention of claim 1 wherein the stored information comprises timer information and the timer information is updated by the second processor until the updated information is returned to the first processor.

10. In a computer system having at least first and second processors, a main memory coupled to said first processor, a second memory coupled to said second processor and an archival memory system such as disk memory, said first processor operating under control of a first operating system loaded into said main memory from said archival memory system, said computer system further including volatile operating system registers for storing information utilized by said first operating system while active on said first processor, a method for retaining said information generated by said first processor under control of said first operating system and stored in said volatile registers so that said information may be used by said first processor under control of a second operating system, said method comprising the steps of:
    (a) storing said information in said volatile operating system registers into said second memory that is not initialized when said first processor and main memory are rebooted;
    (b) initializing the operating system registers so that they contain no information;
    (c) unloading the first operating system from the main memory of said computer system;
    (d) bootstrap loading the second operating system into the main memory of said computer system;
    (e) automatically loading the stored information in said second memory into said volatile operating system registers for use by the second operating system; and
    (f) updating by the second processor the information stored in the second memory until the updated information is loaded back into said volatile operating system registers.

11. The method as recited in claim 10 wherein a supervisory channel timer (SCT) is included in said second memory for storing the time-of-day and further including the step of updating, by means of the second processor said SCT with the correct time-of day.

12. The method as recited in claim 11 including the step of preventing the interruption of said SCT while it is being updated.

13. In a computer system including volatile storage means, a first processor for executing programs under control of a first operating system in the volatile storage means, a second memory, and a second processor for executing programs in the second memory, a method for retaining information generated by said first processor under control of a first operating system so that said information may be used by said first processor under control of a second operating system, said method comprising the steps of:
    (a) saving in the second memory predetermined information from said volatile storage means and utilized by said first operating system, said predetermined information being automatically reloaded back into said volatile storage means when said first processor is restarted under control of said second operating system;
    (b) updating by the second processor the predetermined information stored in the second memory until the predetermined information is reloaded back into said volatile storage means;
    (c) bootstrap loading said second operating system; and
    (d) automatically passing on to said second operating system the predetermined information previously saved in said volatile storage means.

* * * * *